(12) United States Patent
Ali et al.

(10) Patent No.: US 6,351,680 B1
(45) Date of Patent: Feb. 26, 2002

(54) METHOD FOR QUALITY FUNCTION DEPLOYMENT

(75) Inventors: Mohamed Ahmed Ali, Niskayuna; Bharat Sampathkumaran Bagepalli, Niskayuna; Bijan Dorri, Clifton Park, all of NY (US); Thomas Gerard Ebben, Sullivan, WI (US); Aniruddha Dattatraya Gadre, Niskayuna, NY (US); Michael Solomon Idelchik, Mequon, WI (US); Khan Mohamed Khirullah Genghis Khan, Niskayuna, NY (US); Brian Douglas Lounsberry, Thiensville, WI (US); Arlie Russell Martin, Ballston Spa, NY (US); Thomas Frederick Papallo, Jr., Farmington, CT (US); Mark Alan Preston, Niskayuna, NY (US); Raymond Kelsey Seymour, Plainville, CT (US); Douglas J. Snyder, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/312,690

(22) Filed: May 14, 1999

(51) Int. Cl.[7] .............................................. G06F 19/00
(52) U.S. Cl. ................................... 700/109; 700/97
(58) Field of Search ............................ 700/97, 95, 108, 700/109, 174, 204

(56) References Cited

U.S. PATENT DOCUMENTS

| 5,278,751 A | * | 1/1994 | Adiano et al. ............... 700/109 |
| 5,732,200 A | * | 3/1998 | Becker et al. ............... 700/108 |
| 5,765,038 A | * | 6/1998 | Flannery ...................... 700/109 |

OTHER PUBLICATIONS

The House of Quality, Hauser et al, Harvard Business Review, May–Jun. 1988.

* cited by examiner

Primary Examiner—William Grant
Assistant Examiner—Kidest Bahta

(57) ABSTRACT

An exemplary embodiment of the invention is directed to a method for performing quality function deployment for a system having a plurality of levels. The method includes obtaining a plurality of first level critical to quality parameters and obtaining a plurality of first level key control parameters. A first level quality matrix is generated identifying an effect at least one first level key control parameter has on at least one first level critical to quality parameter. The first level key control parameters are arranged into a first group and a second group. A second level quality matrix is generated for the first group. The second level quality matrix includes second level critical to quality parameters corresponding to the first group of first level key control parameters and a second level key control parameter. The second level quality matrix identifies an effect said second level key control parameter has on at least one second level critical to quality parameter.

16 Claims, 11 Drawing Sheets

Fig. 3 (PRIOR ART)

| PRODUCT REQUIREMENT | IMAGE QUALITY | PROJECTOR NOISE | PROJECTOR LIFE | PROJECTOR COST |
|---|---|---|---|---|
| LAMP COST | | | | h |
| LENS COST | | | | h |
| LENS CLARITY | h | | | |
| COOLING SYSTEM NOISE | | h | | |
| LAMP LIFE | | | h | |
| LAMP FOCAL SPOT | h | | | |
| LAMP BRIGHTNESS | h | m | | |
| IMPORTANCE | 1 | 1 | 1 | 1 |

CUSTOMER EXPECTATION

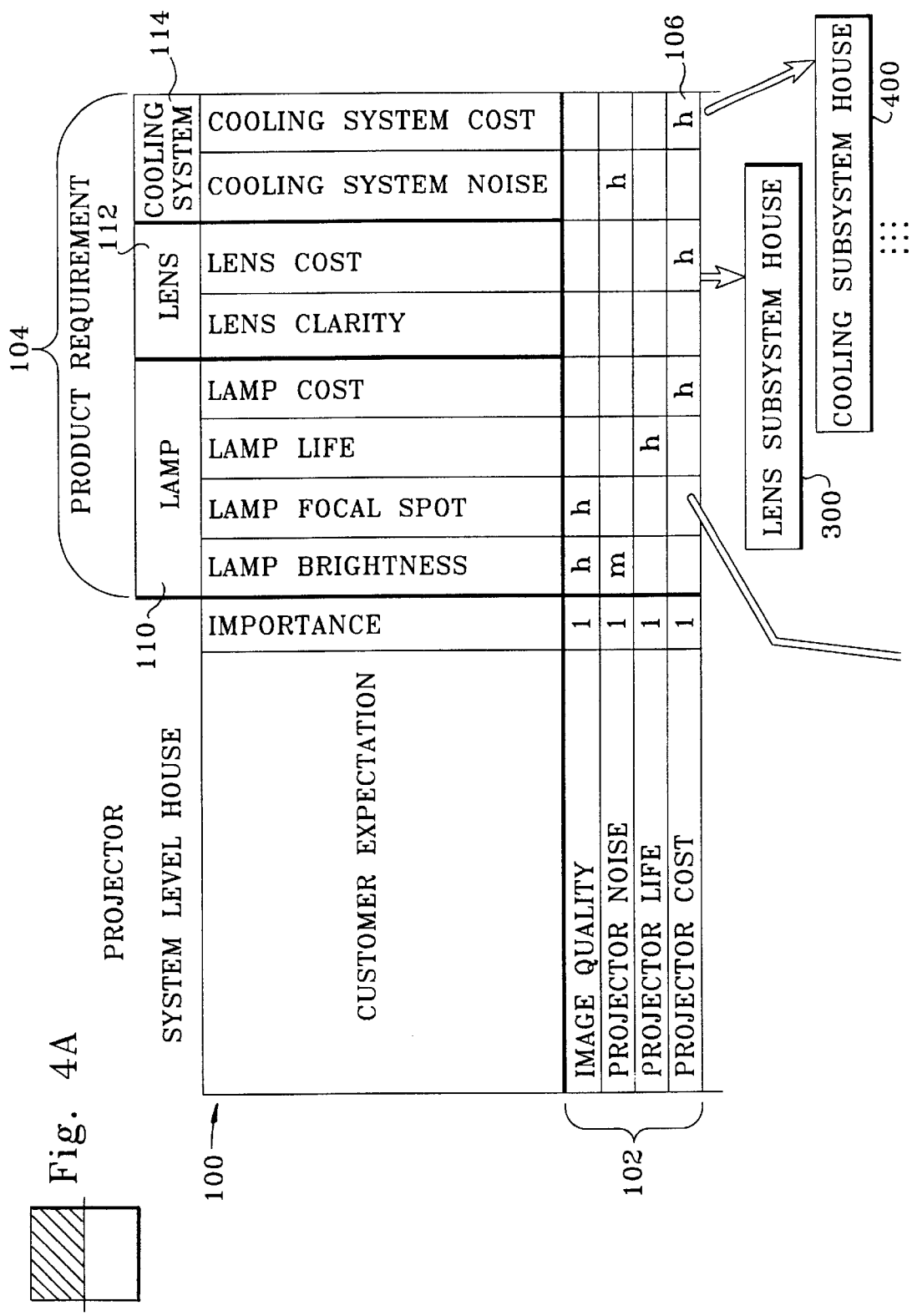

OFF-ON

OFF to ON

| | | OFF TO ON |
|---|---|---|
| 5.6 X-BAR | | |
| 5.5 FRAMES | | |
| 5.4.2 Lo, INCH | | |
| 5.4.1 STIFFNESS, lb/in. | | |
| 5.4 OPERATING SPRINGS | | |
| 5.3 CLOSING LINKS | | |
| 5.2 OPENING LINKS | | |
| 5.1.2 DIST L1, INCH | | |
| 5.1.1 RADIUS, INCH | | |
| 5.1 CRADLE | | |
| 5 MECHANISM | | |

| 1.3.5 | | OFF TO ON |
|---|---|---|
| | 1.3.5.1 | HANDLE FORCE, lbs. |
| | 1.3.5.2 | CONTACT GAP, INCH |
| | 1.3.5.3 | CONTACT CLOSING VEL. INCH/sec |
| | 1.3.5.4 | CONTACT FORCE, lbs. |
| | 1.3.5.5 | CONTACT DEFORMATION, ins. |
| | 1.3.5.6 | HANDLE MOTION, DEGREES |
| DESIRED OUTPUTS (Ys) | | |
| INPUTS (X)=KNP | | |

Fig. 9

PROJECTOR NOISE = 3*(LAMP BRIGHTNESS) + 9*(COOLING SYSTEM NOISE)

PROJECTOR COST = LENS COST + LAMP COST

| CUSTOMER EXPECTATION | PRODUCT REQUIREMENT | | | | | | |
|---|---|---|---|---|---|---|---|
| | LAMP BRIGHTNESS | LAMP FOCAL SPOT | LAMP LIFE | COOLING SYSTEM NOISE | LENS CLARITY | LENS COST | LAMP COST |
| IMPORTANCE | 1 | 1 | 1 | 1 | | | |
| IMAGE QUALITY | h | h | | | h | | |
| PROJECTOR NOISE | m | | | h | | | |
| PROJECTOR LIFE | | | h | | | | |
| PROJECTOR COST | | | | | | h | h |

IMAGE QUALITY = (LAMP BRIGHTNESS) + (LAMP FOCAL SPOT) + (LENS CLARITY)

METHOD FOR QUALITY FUNCTION DEPLOYMENT

BACKGROUND OF THE INVENTION

The invention relates generally to quality function deployment (QFD) and in particular to a method of quality function deployment which preserves the system architecture. A system can be represented as an assemblage of elements working in tandem and forming a unitary object that performs one or more tasks. Typically, components of a system cannot meet the objectives assigned to the whole system. Therefore, a system may be described by its elements, their merits, and the relationships that tie them together. In addition, a component of a system can itself be a system. For example, an engine is a component of another system, an airplane, which in turn can be a part of a bigger system, air transportation, and so on. A tree structure of system, sub-systems, components, parts, etc. can be utilized to represent a system. FIG. 1 shows an exemplary architecture of a projector system which includes sub-system and component levels.

The ability of the system to meet its assigned objective can be gauged using certain figures of merit or critical to quality (CTQ) parameters. Similarly, each element of the system has its own list of CTQ's upon which the performance of the element as part of the system can be gauged. The values of the CTQ's at a first level (e.g., the system level) may depend on the values of the CTQ's at subsequent levels (e.g. sub-system and component levels).

Methods have been developed to define CTQ's at various system levels so that the overall system CTQ's can be met. Quality Function Deployment (QFD) is a known process for identifying CTQ's and flowing them down to subsequent levels. FIG. 2 is a block diagram of a CTQ flow down process. The relationship between each level CTQ's and key control parameters (KCP's) has been referred to as a house of quality. FIG. 2 shows the flow of CTQ's from the customer requirements to functional requirements and then to part characteristics down to manufacturing processes CTQ's and to process variables. At each level, the CTQ's are identified and their relations to the higher level CTQ's are specified qualitatively by high (designated h), medium (designated m), or low (designated l), depending on the relation strength. FIG. 3 is an exemplary house of quality or quality matrix relating customer expectations represented by CTQ's 2 to product requirements represented by key control parameters 4 (KCP's). FIG. 3 illustrates the qualitative effect that each KCP 4 has on one or more CTQ's 2.

When applied at the system level of the example in FIG. 1, QFD will yield a first house of quality for that system as shown in FIG. 3. In that house of quality, KCP's 4 corresponding to different sub-systems of the overall system (e.g. lamp, cooling, lens) are not arranged in any order. This results in a loss of the system architecture and renders analysis of sub-system and component requirements difficult. The problem is particularly evident when flowing down the CTQ's to components and parts of each subsystem. If the tree structure in FIG. 1 is deep, the CTQ list will grow in size and the system structure will be difficult, if not impossible, to ascertain. Therefore, existing QFD is valuable for "shallow" systems (e.g., systems with a limited number of elements and levels) but has disadvantages when applied to "deep" systems having numerous levels and components.

BRIEF SUMMARY OF THE INVENTION

An exemplary embodiment of the invention is directed to a method for performing quality function deployment for a system having a plurality of levels. The method includes obtaining a plurality of first level critical to quality parameters and obtaining a plurality of first level key control parameters. A first level quality matrix is generated identifying an effect at least one first level key control parameter has on at least one first level critical to quality parameter. The first level key control parameters are arranged into a first group and a second group. A second level quality matrix is generated for the first group. The second level quality matrix includes second level critical to quality parameters corresponding to the first group of first level key control parameters and at least one second level key control parameter. The second level quality matrix identifies an effect at least one second level key control parameter has on at least one second level critical to quality parameter.

BRIEF DESCRIPTION OF THE DRAWINGS

FIG. 3 is an exemplary house of quality for the system level of FIG. 2;

FIG. 9 depicts generation of a quantitative relationship between CTQ's and KCP's.

DETAILED DESCRIPTION OF THE INVENTION

An exemplary embodiment of the invention is directed to a QFD process which preserves system architecture. The process includes generating a plurality of quality matrices each focusing on a certain element of the system while maintaining their common systemic grounds which stems from sharing the same CTQ's at the higher level quality matrix. The term "quality matrix" refers to defining a relationship between CTQ's and KCP's and is not limited to a conventional matrix format (i.e., rows and columns).

Figure 4B:
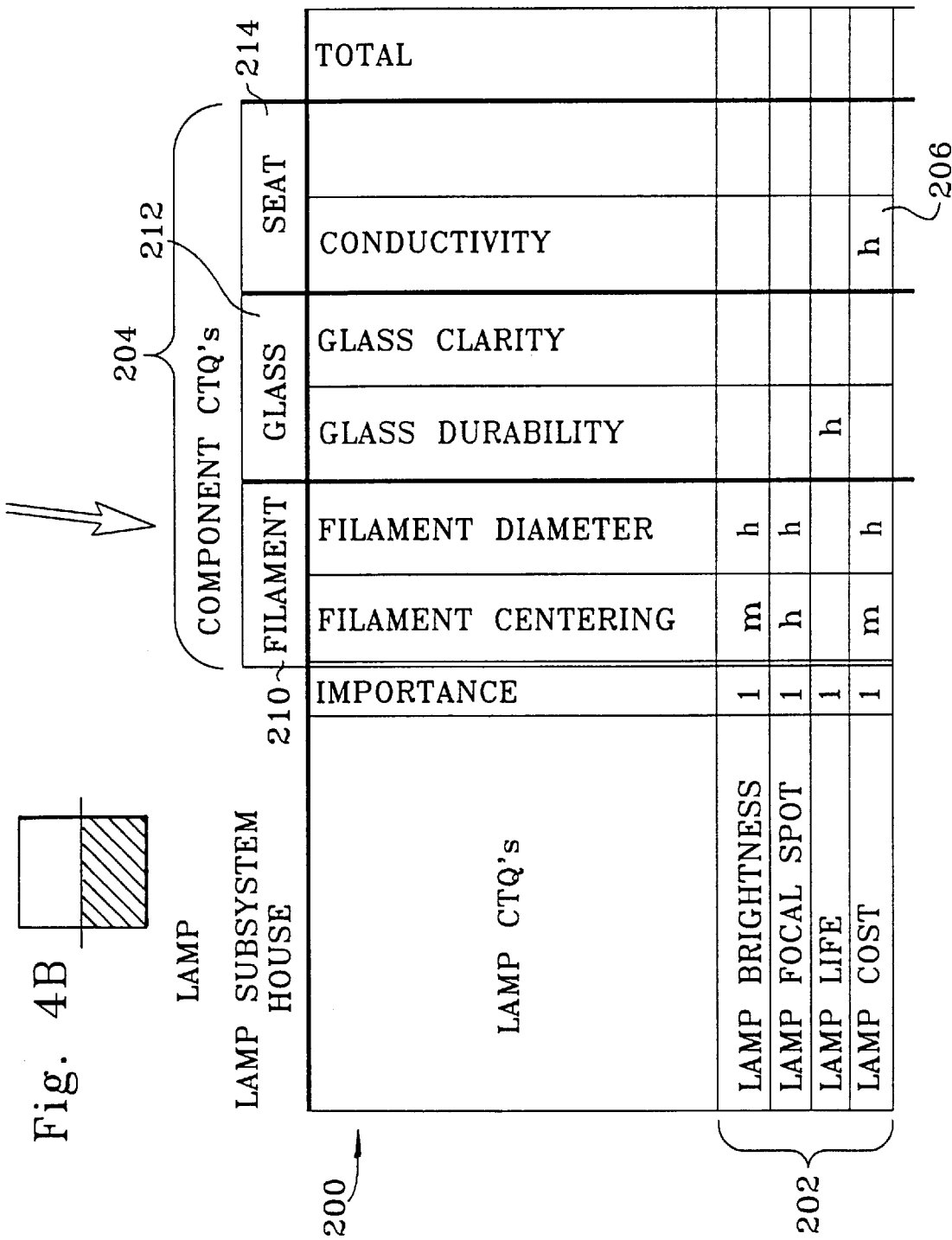
FIG. 4 is a diagrammatic representation of quality function deployment across multiple levels in an exemplary embodiment of the invention.

FIG. 4 depicts an arrangement of quality matrices in an exemplary embodiment of the invention. At a first level, a system quality matrix 100 relates CTQ's 102 to KCP's 104. At the intersection of a CTQ 102 and KCP 104, an interaction weight 106 may be entered representing qualitatively how the KCP affects the CTQ. The interaction weights 106 can be used to derive a quantitative measure of how a KCP influences a CTQ as described herein with reference to FIG. 9. The KCP's 104 are arranged in a plurality of groups 110, 112 and 114. Each group of KCP's corresponds to a sub-system. A second level quality matrix is formed for each of the groups of KCP's. For example, as shown in FIG. 4, the first level KCP's in group 110 are used as the CTQ's 202 in second level quality matrix 200. The second level quality matrix 200 is similar to the first level quality matrix 100 in that the CTQ's 202 are related to KCP's 204 through interaction weights 206. In addition, the second level KCP's 204 are arranged in groups 210, 212 and 214. A third level quality matrix can be formed for each group of second level KCP's 210, 212 and 214 by using the KCP's for each group 210, 212 and 214 as the CTQ's in third level quality matrices. Second level quality matrices 300 and 400 are generated for KCP groups 112 and 114 in a manner similar to quality matrix 200.

Figure 5:
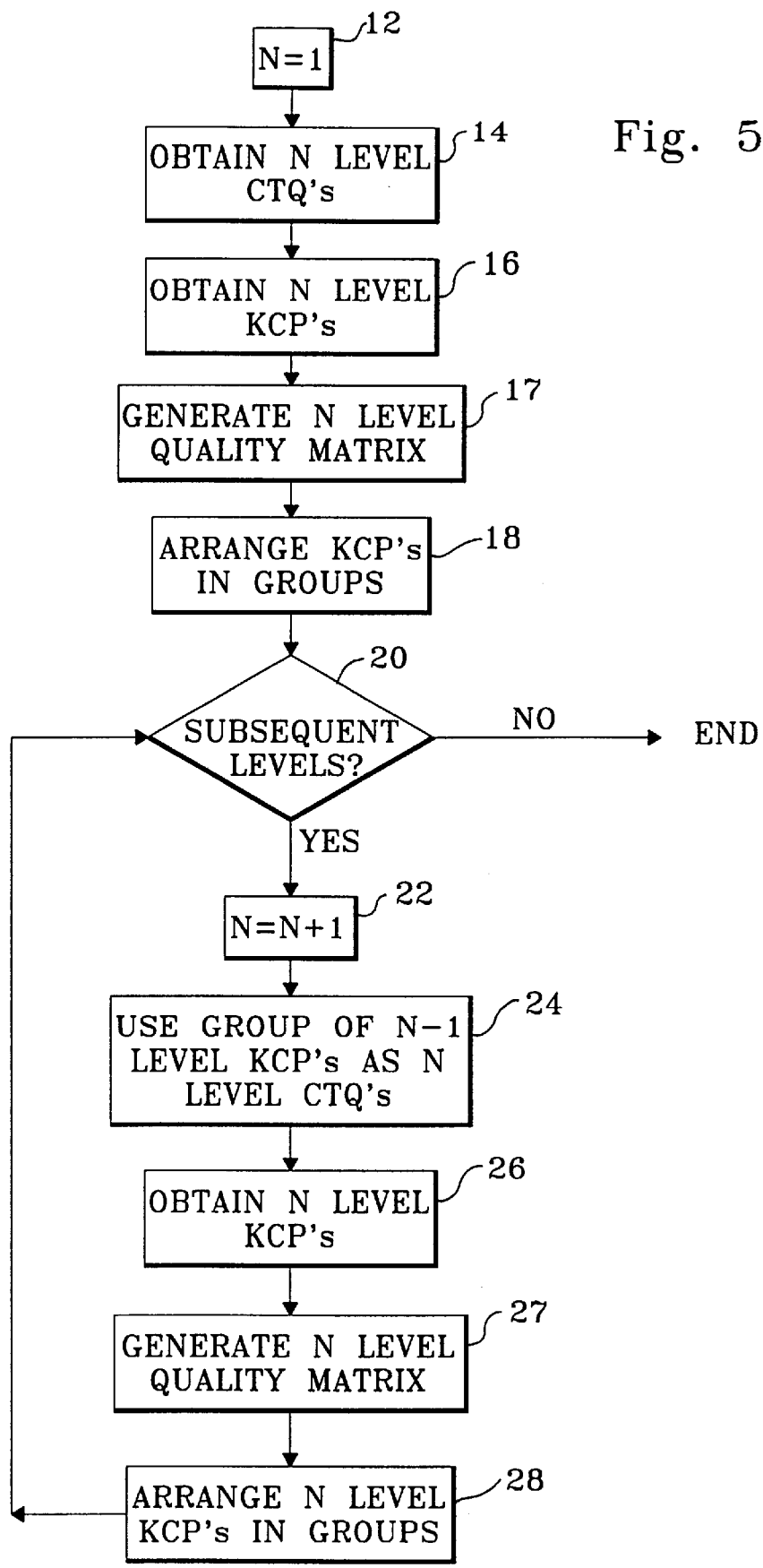
FIG. 5 is a flowchart of a process for generating quality matrices.

FIG. 5 is a flowchart of a process of generating the quality matrices in FIG. 4. The process may be implemented on a general purpose computer programmed to execute the steps shown in FIG. 5. At step 12, a variable N is set to one and is used to track the level of each quality matrix. At step 14, the CTQ's for level N are obtained. The CTQ's may be obtained from memory or through a user interface as described herein with reference to FIG. 6. At 16, the KCP's for level N are obtained. The KCP's may be obtained from memory or through the user interface. At step 17, the N level quality matrix is formed identifying a relationship between one or more CTQ's and KCP's. At step 18, the KCP's are arranged in groups if the KCP's were not entered in groups in step 16. As described above, the groups correspond to the CTQ's of subsequent level quality matrices. At step 20, it is determined if there are subsequent levels. If not, the process ends. If so, the variable N is incremented by one at step 22 and subsequent level quality matrices are formed for each group of KCP's for the preceding level. At step 24, a group of KCP's from the N–1 level quality matrix is used as the CTQ's for the N level quality matrix. At step 26, the KCP's for the N level quality matrix are obtained and at step 27, the N level quality matrix is formed identifying a relationship between one or more CTQ's and KCP's. The KCP's are arranged in groups at step 28 if not previously grouped. Flow proceeds to step 20 where the process is continued until all levels have been generated.

Figure 6A:
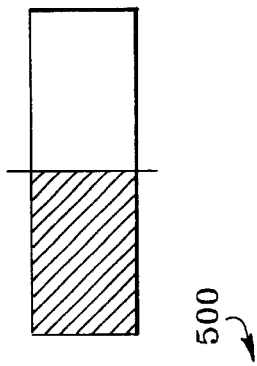
FIG. 6 depicts alternative system descriptions in an exemplary embodiment of the invention.
Figure 6B:
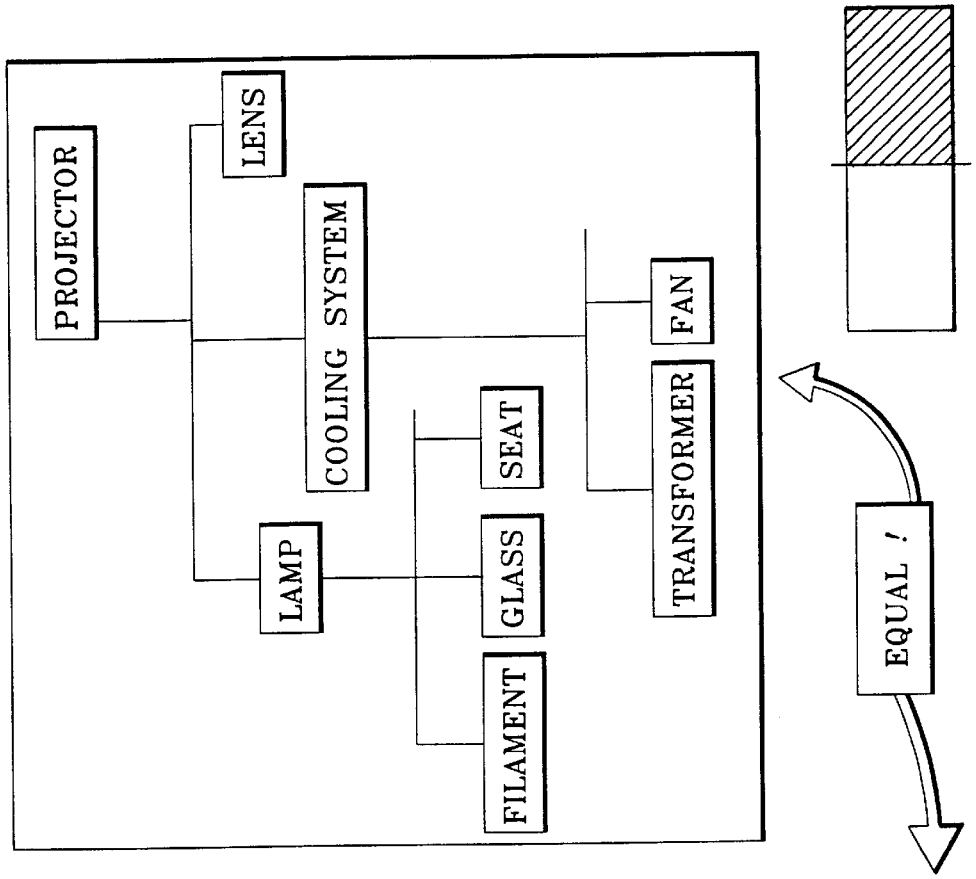
Figure 6B:
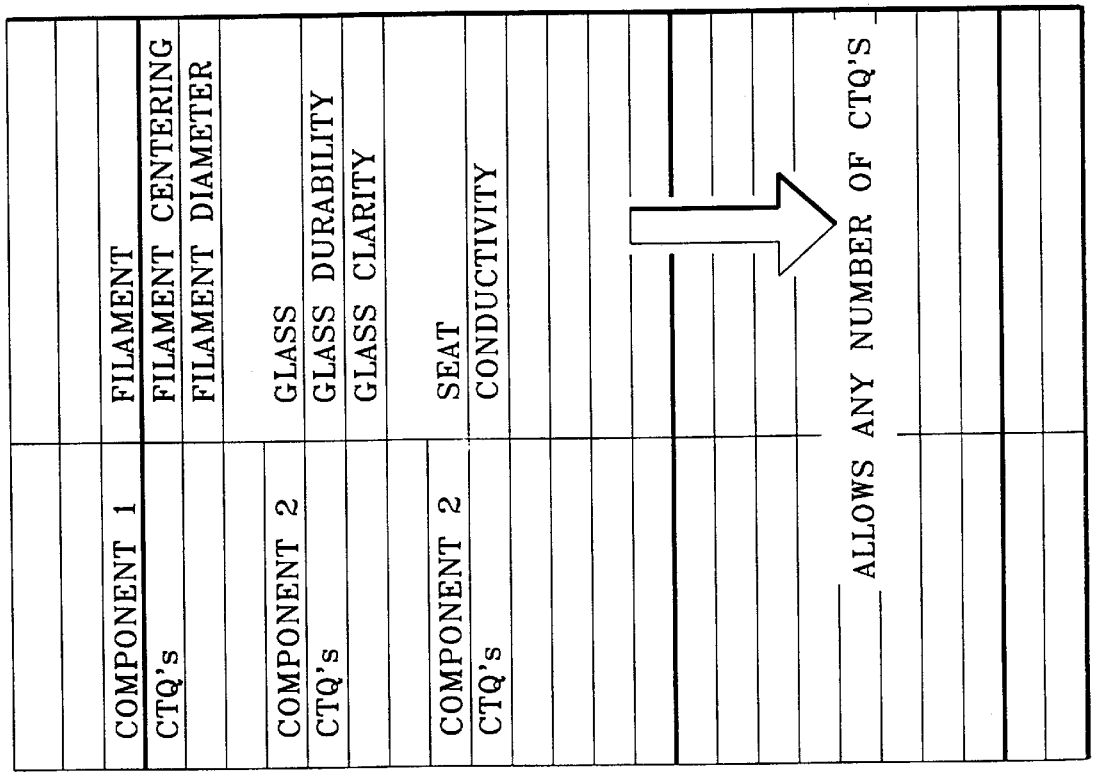

FIG. 6 depicts a user interface that can be used to input system, sub-system, component, etc. CTQ's. The user interface is depicted as a table 500 through which the user identifies the system, sub-systems, components for each subsystem, etc. to define the levels of the system. It is understood that other user interfaces may be used and the format shown in FIG. 6 is exemplary. The CTQ's for each level of the system are also entered in table 500. For example, as shown in FIG. 6, the user has identified three subsystems (lamp, cooling system and lens) each of which has CTQ's. As described above, the CTQ's of a subsequent level are the KCP's of a current level so that the user only enters CTQ's. Quality matrices, such as those shown in FIG. 4, will be generated automatically. The table format of user interface 500 is equivalent to the tree architecture of FIG. 1 as shown in FIG. 6. This can be viewed as lateral relation between system elements rather than the only vertical architecture shown in FIG. 1.

In some cases, CTQ's of a subsystem will be dependent on CTQ's of other subsystems. For example, lamp subsystem CTQ's may depend on the fan CTQ's. In that case, the fan CTQ's can be reported twice; once in the lamp sub-system quality matrix and once in the cooling sub-system quality matrix. The lamp sub-system quality matrix and the cooling sub-system quality matrix share a common KCP. In this scenario, the lamp sub-system CTQ's may be considered dependent on the independent fan CTQ's. The independent CTQ's can be reported in different quality matrices as long as it is understood that they refer to the same set of CTQ's.

Figure 1:
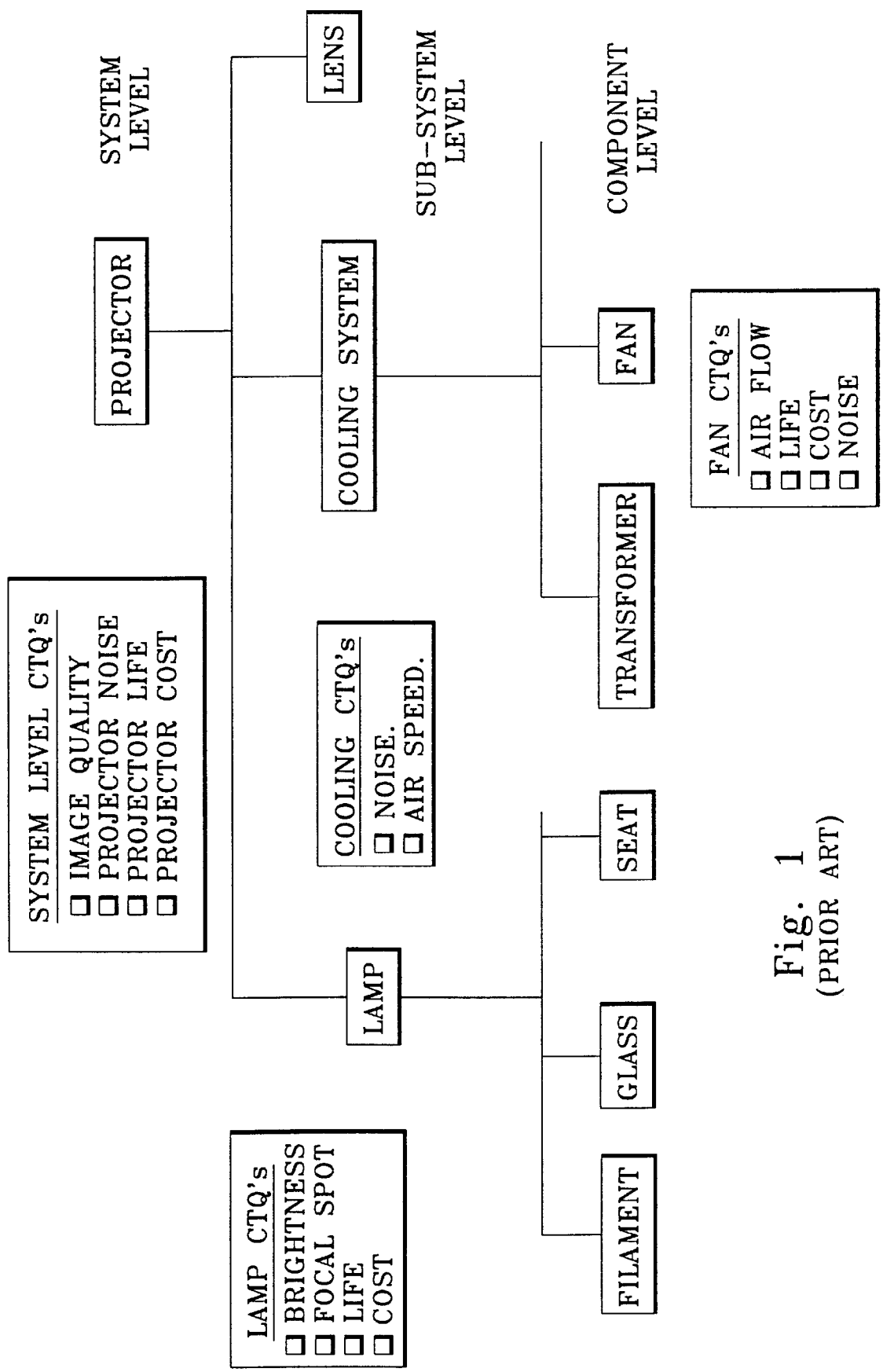
FIG. 1 is block diagram depicting a tree structure of a system.
Figure 2:
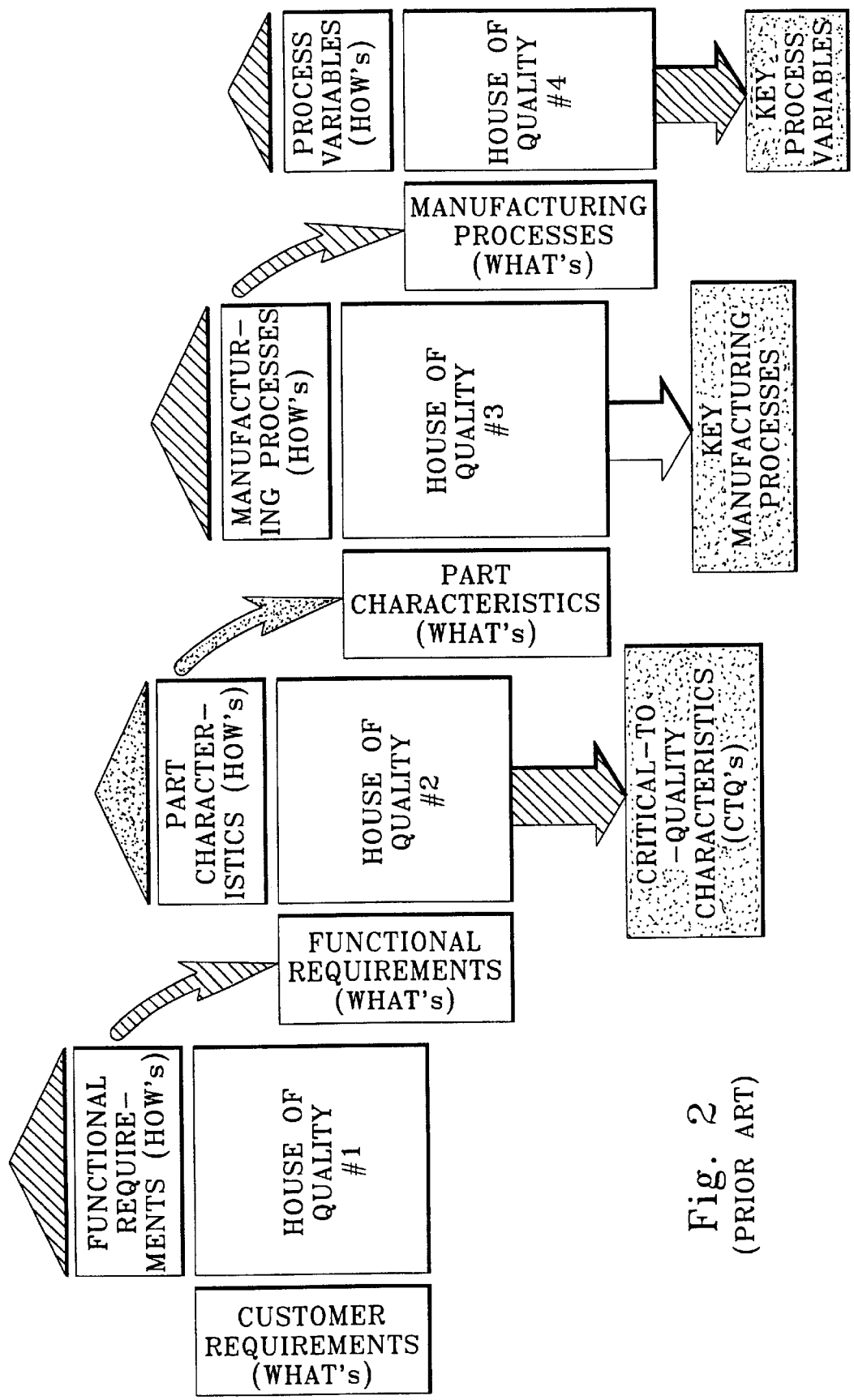
FIG. 2 is a diagrammatic representation of conventional quality function deployment across multiple levels.
Figure 7:
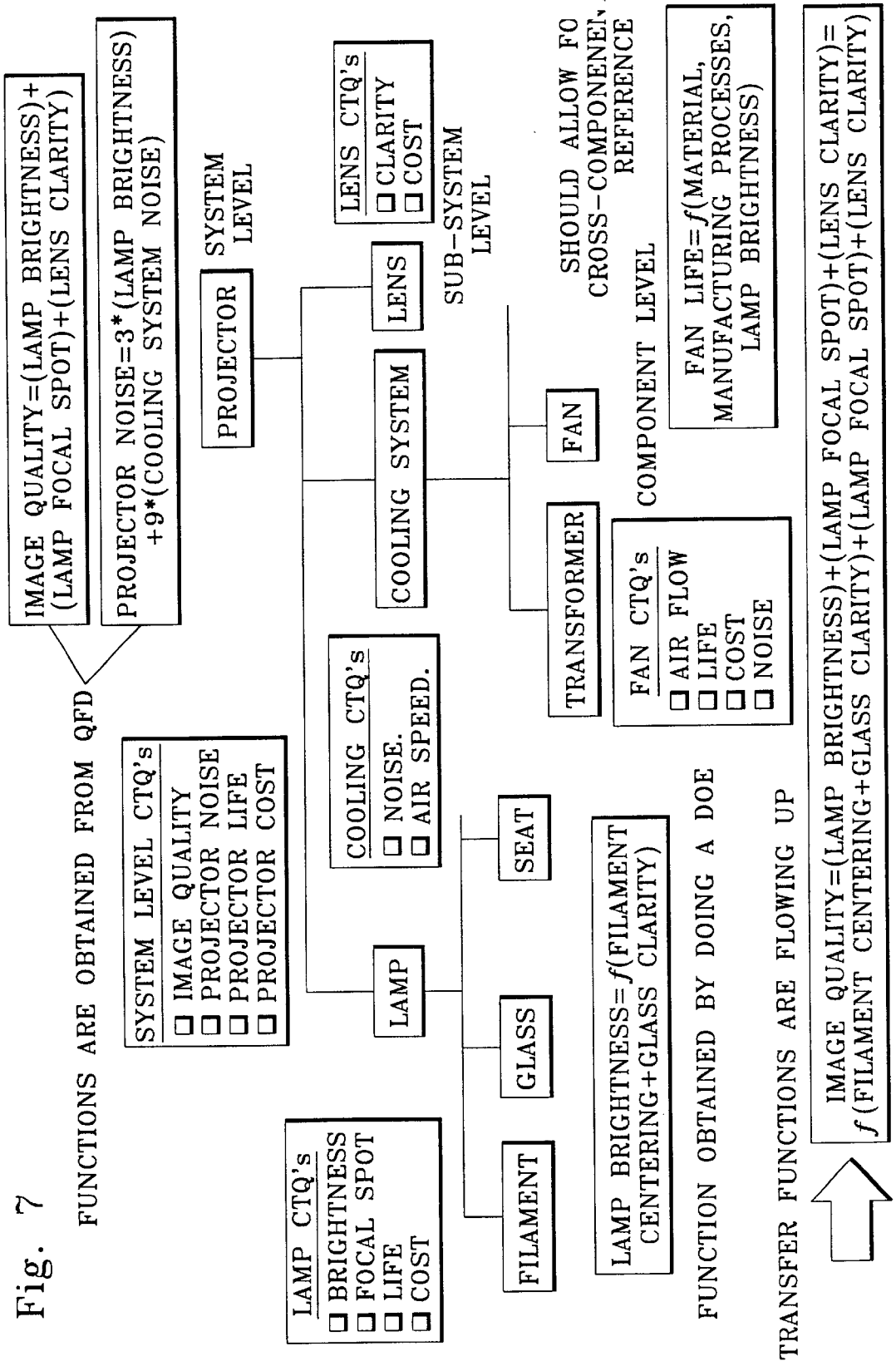
FIG. 7 depicts a system description including transfer functions.

Existing QFD has a drawback in that the relationships between CTQ's and KCP's are usually more complex than can be qualitatively identified by high, medium, or low. Generally, the relation between CTQ's and KCP's can be described quantitatively through the use of transfer functions. FIG. 7 shows the tree structure of FIG. 1 depicting relationships between CTQ's and KCP's using various transfer functions. For example, the system level CTQ of image quality is defined as a function of lamp brightness, lamp focal spot and lens clarity. The transfer functions can be used in the framework of QFD by replacing the high, medium, and low interaction weights with a mathematical sensitivity of each dependent CTQ to each KCP. The mathematical sensitivity is a quantitative value based on the transfer function and may correspond to the partial derivative of the transfer function relating the CTQ to the KCP's.

A system level CTQ can be the function of a sub-system CTQ which in turn is a function of a third level CTQ, etc. Therefore, a first level CTQ can be a function of the lowest level KCP's through a chain of transfer functions. This relationship is shown in FIG. 7 where image quality (a system level CTQ) is a function of lamp brightness, lamp focal spot, and lens clarity. Lamp brightness itself is a function of filament centering and glass clarity. Therefore, the image quality can be a function of filament centering, glass clarity, lamp focal spot, and lens clarity. This chain of functions may continue until the system CTQ's are expressed as lowest level KCP's. This provides a quantitative transfer function which facilitates optimizing system CTQ's by modifying lower level KCP's.

Figure 8:
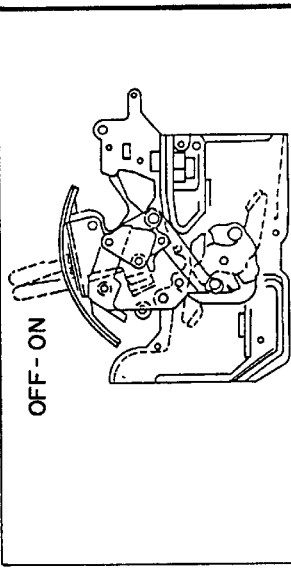
FIG. 8 depicts use of a computer aided process to develop a transfer function.
Figure 8:
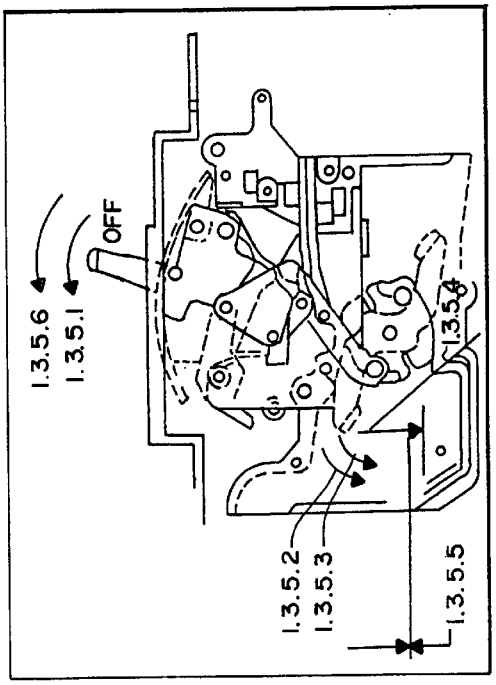

The transfer functions relating CTQ's to KCP's do not have to be closed form mathematical equations. The transfer functions may be represented by computer-aided processes and routines that relate CTQ's to KCP's. FIG. 8 depicts use of CAD/CAM/CAE (or any other tool that provides transfer functions such as finite-element tools) to relate CTQ's to KCP's. In addition, the transfer functions relating CTQ's to KCP's can be either probabilistic or deterministic and computational tools (e.g., Monte-Carlo, propagation of error, fast probabilistic integration, etc.) can be utilized as part of the transfer function itself. The only condition in utilizing transfer functions is that each CTQ can be defined uniquely as a function of other KCP's. Lateral relations between CTQ's are also accommodated as long as the above condition holds.

Using transfer functions to relate CTQ's to KCP's provides for quantitative QFD. In many cases, however, a transfer function cannot be established to relate certain types of CTQ's and KCP's either because of their complexity or because they do not have a physical representation. In this situation, empirical transfer functions may be utilized. A qualitative QFD, based on low, medium and high interaction weights, can be translated into empirical transfer functions. This is accomplished by assigning a set of numerical weights $w_1$, $w_2$, and $w_3$ corresponding to high, medium, or low (respectively) interaction weights to define the relationship between CTQ's and KCP's. The relationship $w_1>w_2>w_3$ should be maintained while selecting the weights. In the example in FIG. 9, a high interaction is assigned a weight of 9, a medium interaction is assigned a weight of 3 and a low interaction is assigned a weight of 1. As shown in FIG. 9, the CTQ of projector noise is equated to the KCP's through empirical transfer function 3*(lamp brightness)+9*(cooling system noise). The projector cost CTQ is represented by lens cost+lamp cost. For the projector cost CTQ, the relevant KCP's have the same interaction weight (i.e., high) so the numerical weights are not needed in the empirical transfer function. In the example shown in FIG. 9, a linear combination of independent CTQ's was utilized for the empirical transfer function, however, other empirical equations (including nonlinear functions) can be utilized as appropriate. It is understood that interaction weights other than high, medium and low may be are used. For example, if only high and low are used as interaction weights then only two numerical weights w1 and w2 are required. Alternatively, a numerically continues range (e.g., 1–10) of numerical weights can be used.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for performing quality function deployment for a system having a plurality of levels, the method comprising:

obtaining a plurality of first level critical to quality parameters;

obtaining a plurality of first level key control parameters;

generating a first level quality matrix, said first level quality matrix identifying an effect at least one first level key control parameter has on at least one first level critical to quality parameter;

arranging said first level key control parameters into a first group and a second group; and generating a second level quality matrix for said first group, said second level quality matrix having second level critical to quality parameters corresponding to said first group of first level key control parameters and a second level key control parameter, said second level quality matrix identifying an effect said second level key control parameter has on at least one second level critical to quality parameter.

2. The method of claim 1 further comprising:

generating a further second level quality matrix for said second group, said further second level quality matrix having second level critical to quality parameters corresponding to said second group of first level key control parameters and a second level key control parameter, said second level quality matrix identifying an effect said second level key control parameter has on at least one second level critical to quality parameter.

3. The method of claim 1 wherein:

said first level quality matrix defines a quantitative relationship between one first level critical to quality parameter and at least one first level key control parameter.

4. The method of claim 3 wherein:

said quantitative relationship is defined by a transfer function relating said one first level critical to quality parameter to said at least one first level key control parameter.

5. The method of claim 4 further comprising:

obtaining a plurality of interaction weights, each interaction weight representing an effect one of said first level key control parameters has on one of said first level critical to quality parameters;

generating an empirical transfer function relating one of said first level critical to quality parameters to a plurality of said first level key control parameters in response to said interaction weights.

6. The method of claim 5 wherein:

said interaction weights are assigned numerical values.

7. The method of claim 2 wherein:

said second level quality matrix and said further second level quality matrix each includes a common second level key control parameter.

8. The method of claim 4 wherein:

said transfer function is a linear transfer function.

9. A storage medium encoded with machine-readable computer program code for performing quality function deployment for a system having a plurality of levels, the program code causing a computer to implement a method of:

obtaining a plurality of first level critical to quality parameters;

obtaining a plurality of first level key control parameters;

generating a first level quality matrix, said first level quality matrix identifying an effect at least one first level key control parameter has on at least one first level critical to quality parameter;

arranging said first level key control parameters into a first group and a second group; and generating a second level quality matrix for said first group, said second level quality matrix having second level critical to quality parameters corresponding to said first group of first level key control parameters and a second level key control parameter, said second level quality matrix identifying an effect said second level key control parameter has on at least one second level critical to quality parameter.

10. The storage medium of claim 9 further comprising program code for causing the computer to implement:

generating a further second level quality matrix for said second group, said further second level quality matrix having second level critical to quality parameters corresponding to said second group of first level key control parameters and a second level key control parameter, said second level quality matrix identifying an effect said second level key control parameter has on at least one second level critical to quality parameter.

11. The storage medium of claim 9 wherein:

said first level quality matrix defines a quantitative relationship between one first level critical to quality parameter and at least one first level key control parameter.

12. The storage medium of claim 11 wherein:
said quantitative relationship is defined by a transfer function relating said one first level critical to quality parameter to said at least one first level key control parameter.

13. The storage medium of claim 12 further comprising program code for causing the computer to implement:
obtaining a plurality of interaction weights, each interaction weight representing an effect one of said first level key control parameters has on one of said first level critical to quality parameters;
generating an empirical transfer function relating one of said first level critical to quality parameters to a plurality of said first level key control parameters in response to said interaction weights.

14. The storage medium of claim 13 wherein:
said interaction weights are assigned numerical values.

15. The storage medium of claim 10 wherein:
said second level quality matrix and said further second level quality matrix each includes a common second level key control parameter.

16. The storage medium of claim 12 wherein:
said transfer function is a linear transfer function.

* * * * *